United States Patent
Adams et al.

(10) Patent No.: US 6,644,974 B2
(45) Date of Patent: Nov. 11, 2003

(54) EDUCATIONAL PROCESS THAT PRODUCES DELIVERABLE DOCUMENT

(75) Inventors: Debra M. Adams, Austell, GA (US); Dillon B. Edwards, Woodbury, CT (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 09/910,935

(22) Filed: Jul. 24, 2001

(65) Prior Publication Data

US 2003/0022139 A1 Jan. 30, 2003

(51) Int. Cl.7 ............................................. G09B 19/00
(52) U.S. Cl. ....................................................... 434/219
(58) Field of Search ................................ 434/219, 118, 434/156, 169, 307 R, 308, 322, 323, 327, 362, 365, 335

(56) References Cited

U.S. PATENT DOCUMENTS

| | | | |
|---|---|---|---|
| 5,372,507 A | * 12/1994 | Goleh | 434/118 |
| 5,489,213 A | 2/1996 | Makipaa | |
| 5,597,312 A | * 1/1997 | Bloom et al. | 434/362 |
| 5,616,033 A | * 4/1997 | Kerwin | 434/118 |
| 5,772,446 A | * 6/1998 | Rosen | 434/307 R |
| 5,835,902 A | 11/1998 | Jannarone | |
| 5,974,446 A | 10/1999 | Sonnenreich et al. | |
| 6,039,575 A | 3/2000 | L'Allier et al. | |
| 6,062,862 A | 5/2000 | Koskinen | |
| 6,074,216 A | 6/2000 | Cueto | |
| 6,076,108 A | 6/2000 | Courts et al. | |
| 6,125,358 A | 9/2000 | Hubbell et al. | |
| 6,135,776 A | 10/2000 | Erturk et al. | |
| 6,171,112 B1 | 1/2001 | Clark et al. | |
| 6,196,846 B1 | 3/2001 | Berger et al. | |
| 6,201,948 B1 | 3/2001 | Cook et al. | |
| 6,216,119 B1 | 4/2001 | Jannarone | |

OTHER PUBLICATIONS

Riel, Margaret, "Education in the 21st Century: Just-in-Time Learning or Learning Communities," The Fourth Annual Conference of the Emirates Center for Strategic Studies and Research, Abu Dhabi, May 24–26, 1998.

* cited by examiner

*Primary Examiner*—Mahmoud Gimie
(74) *Attorney, Agent, or Firm*—McGinn & Gibb, PLLC; Marc A. Ehrlich, Esq.

(57) ABSTRACT

A system and method for providing education that includes a database of educational material and a user interface. When prompted by a user through the user interface, the system provides a specific educational session from the database that is directed to satisfying a present business need/solution (e.g., a need for a specific legally binding written document with a customer or supplier). With the invention, the educational session produces a completed version of the legally binding written document. The user interface preferably includes a decision tree providing options for the user to select from different computerized educational sessions relating only to the present business need/solution. While the database includes educational material relating to many business needs/solutions, the decision tree limits user access to only those educational sessions relating to the present business need/solution. The database is continually updated with current educational information that corresponds to related corporate goals. Also, the specific educational session is preferably presented only to a single user and only when the business need/solution is presently pending.

31 Claims, 3 Drawing Sheets

EDUCATIONAL PROCESS THAT PRODUCES DELIVERABLE DOCUMENT

BACKGROUND OF THE INVENTION

1. Field of the Invention

The present invention generally relates to providing users with educational material and more particularly to an improved system and method that provides only enough educational material required to solve a real-world business need, where the educational material actually produces a project or contractual deliverable (as opposed to a simulated or stimulated example or model) product.

2. Description of the Related Art

One of the largest challenges facing corporations today is the ability to keep its employees knowledgeable, not just on the specifics of their job, but also about the bigger corporation and the world in context. Traditional teaching and training methods center on the idea of imparting huge amounts of knowledge on a topic during a traditional in-class training session which lasts for days. This approach is problematic because the student may be learning too much or too little for their given position within the organization. In addition, the student may not be learning at the right pace considering the students' level of competence, background and experience. Further the educational sessions can occupy employees for large periods of time (3–5 days). In addition, the educational sessions may not be given frequently enough to provide employees with information consistent with the corporation's ever-changing business goals.

With the advent of computerized networks including the World Wide Web interface of the Internet, educational sessions can be given to employees on an individual basis. This allows the employees to partake of the educational session when it is convenient for them and at their own pace. However, conventional computerized educational sessions are sometimes nothing more than elaborate message boards or e-mail systems (for example see U.S. Pat. No. 5,974,446). The U.S. patents mentioned in this application are hereby incorporated by reference.

Other computerized educational systems simply provide education on a theoretical topic which may or may not relate to contemporary business needs of the employee. For example, U.S. Pat. No. 6,062,862 provides a system of transferring mentor experience over a network and U.S. Pat. No. 6,135,776 presents a predetermined course content; However, the educational content provided in these may not be specifically applicable to the employee's current business need and may not be consistent with the corporation's current business goals. Other network educational systems allowed direct or indirect contact between the students and the teacher (see the U.S. Pat. Nos. 6,196,846; 6,201,948; and 6,074,216).

One example of a conventional networked educational system is found in U.S. Pat. No. 6,125,358 which provides an educational curriculum that is based upon simulated business problems and solutions. The educational system is highly tailored to the individual student and dynamically changes depending upon the students' performance during the course. However, a major drawback of such educational systems is that the topic is entirely theoretical and is not necessarily applicable to a pending business need/solution. Therefore, there is a need to provide an educational system that is applicable to real-world problems and that is available to solve business problems as they occur. Further, there is a need for an educational system that consistently mirrors the ever-changing goals of the corporation. The invention described below provides such a system which operates in an efficient and user-friendly manner.

SUMMARY OF THE INVENTION

In view of the foregoing and other problems, disadvantages, and drawbacks of the conventional educational sessions the present invention has been devised, and it is an object of the present invention to provide a structure and method for an improved educational session.

In order to attain the object(s) suggested above, there is provided, according to one aspect of the invention a system and method for providing education that includes a database of educational material and a user interface. The problem statement resolved by the invention is as follows: A business practitioner is faced with the immediate need to "procure" goods and/or services. There is no mentor or other physical assistance available to the practitioner, but they do have access to the worldwide web. The practitioner needs to understand the "why" (educational content) associated with the procurement they are about to make, as well as actually producing what will become a legally binding document. The format and content of the course produced document will change depending upon the goods or services being procured. When prompted by a user through the user interface, the system provides a specific educational session from the database that is directed to satisfying a present business need/solution (e.g., a need for a specific legally binding written document with a supplier). With the invention, the educational session produces a completed version of the legally binding written document. The user interface preferably includes a decision tree providing options for the user to select from different computerized educational sessions relating only to the present procurement need/solution. While the database includes educational material relating to many procurement needs/solutions, the decision tree limits user access to only those educational sessions relating to the present business need/solution. The database is continually updated with current educational information that corresponds to related corporate goals. Also, the specific educational session is preferably presented only to a single user and only when the procurement need/solution is presently pending.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

The inventors have based the present invention on the premise that education would be more effective if it addressed a real time need on the part of the student, and delivered a useful work product (e.g., a "project deliverable") instead of a theoretical product. As used in this invention, a "deliverable document" is a finished document that will be used by a corporation in its operations to achieve its corporate goals. Therefore, a deliverable document is one the corporation would use to communicate with and/or form a binding relationship with an internal/external party and is not a purely theoretical simulated or stimulated (educational) based example. Therefore, an important distinguishing feature of the invention is that its primary goal is to produce a useful business document. To the contrary, conventional educational systems have a primary goal of educating the student principally in theory.

The invention is explained below by using an example of a supplier statement of work (SOW) document. In essence, the statement of work document is a legally binding contract between a corporation and a supplier. In this example, the SOW document could be in one of six commodity drafts used by a corporate procurement department. However, the invention is not limited to just producing statement of work documents. To the contrary, the invention of can be used with any type of corporate document produced. For example, the invention could be used to produce letters, memorandum, marketing material, invoices, inventory management documents, etc. Therefore, while the invention is discussed with respect to a specific embodiment (e.g., the SOW), the invention is not limited thereto. Instead, the invention is applicable to any educational need within an organization which produces a deliverable work document that will actually be used by an organization in its daily operation.

Figure 1:
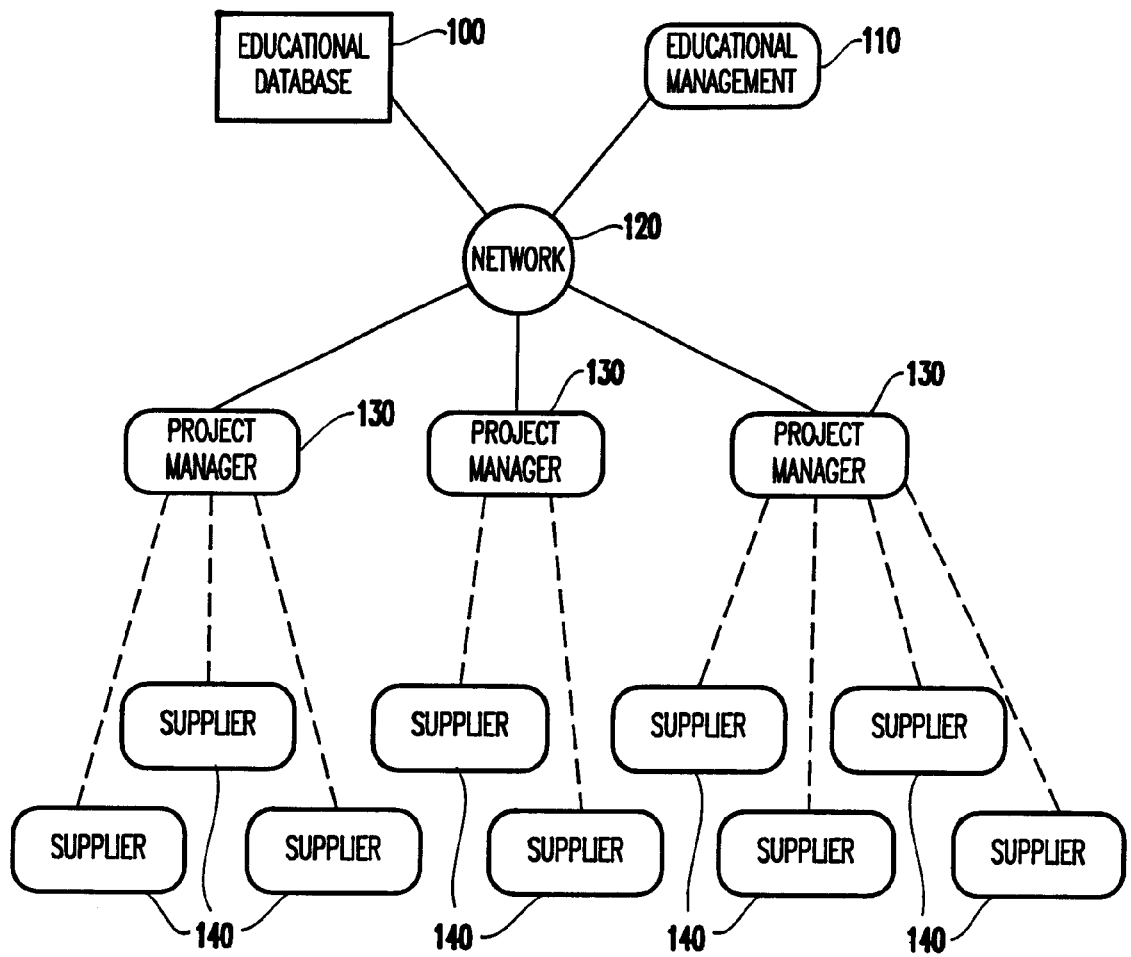
FIG. 1 is a schematic diagram of a system according to the invention.

Referring now to the drawings, there are shown preferred embodiments of the method and structures according to the present invention. More specifically, FIG. 1 illustrates a system for carrying out the invention. In FIG. 1, the invention includes an educational database(s) 100 that is connected to a network 120. The educational database 100 is updated and maintained through an educational management module 110. Project managers 130 (user interfaces) can access the educational database 100 to create legally binding documents with suppliers 142 that supply goods and/or services to the corporation. The project manager is the person that should be receiving the education and the procurement buyer negotiates with the supplier for contracting of goods and services. The educational database 100 is maintained by the educational management module 110 to be consistent with current corporate goals and needs. For example, a specific supply component or technology may present contractual issues that the corporation desires to have handled uniformly so as to foster current corporate goals. Therefore, if a particular technology presents a certain risk to a corporation, the educational session regarding that technology within the educational data base 100 would contain specific educational material regarding document language that is necessary to reduce that risk to the corporation. Similarly, if a certain technology is in high demand by the corporation, the educational session associated with that technology may require that the SOW be drafted to require abnormally quick delivery guarantees. Therefore, the educational management module 110 is important in keeping the educational database 100 consistent with corporate goals and needs.

Figure 2:
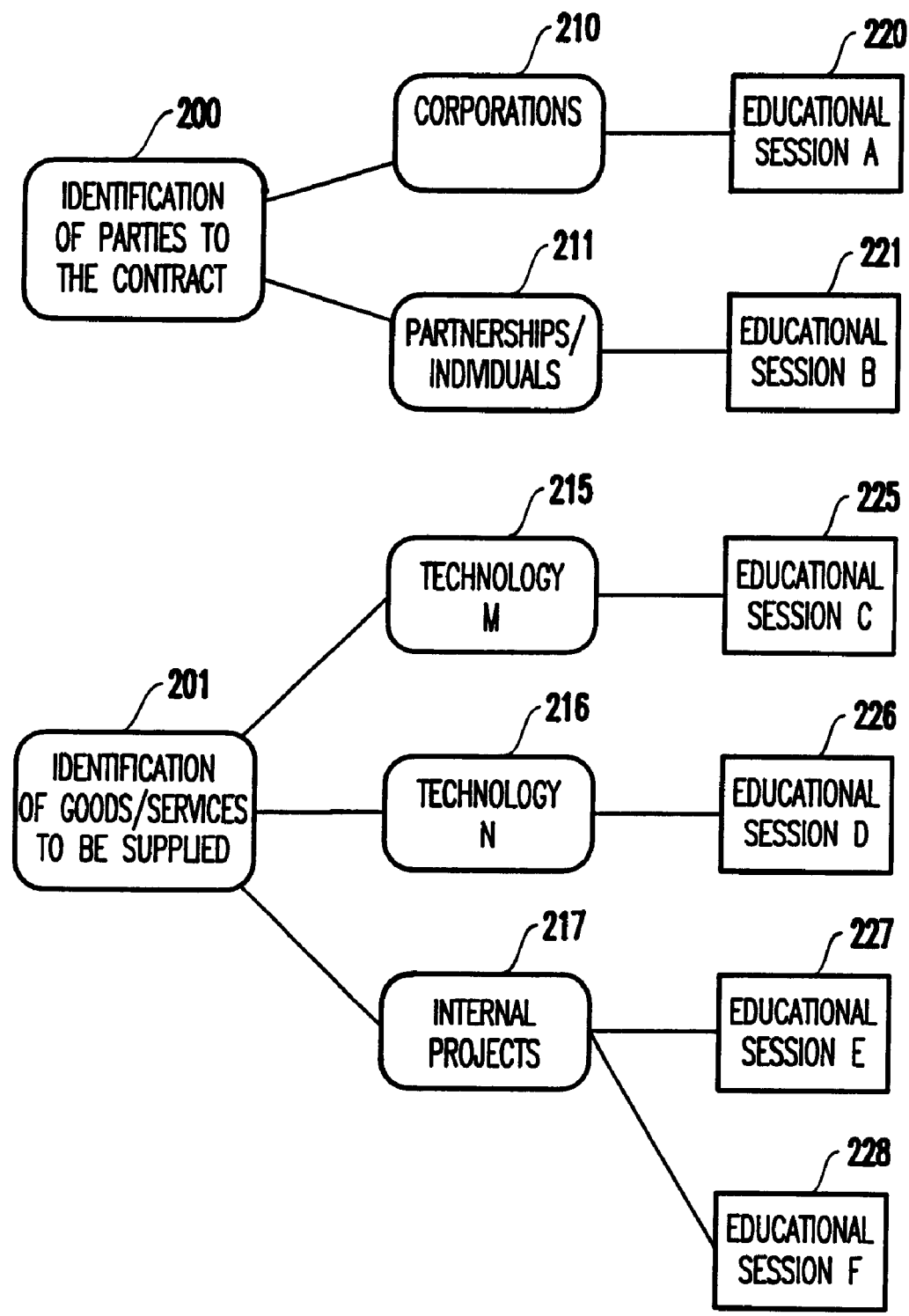
FIG. 2 is a schematic diagram of a decision tree according to the invention.

FIG. 2 illustrates a very simplified decision tree that the invention can use to steer the project manager 130 toward the proper educational session within the educational database 100. As would be known by one ordinarily skilled in the art given this disclosure, the decision tree shown in FIG. 2 is merely exemplary of very limited issues that may be considered when educating the project manager 130. The invention is not strictly limited to the decision tree shown in FIG. 2. Instead, the issues that arise while drafting any form of document are dynamic and will vary from type of document to type of document as well as from corporation to corporation. FIG. 2 is only provided to demonstrate that the invention allows the user (e.g., project manager 130) to direct themselves to the proper educational session. Upon completing the educational session, the invention provides the user with specific document language that can be immediately used to prepare a deliverable document.

More specifically, in FIG. 2, two topics are identified including the identification of parties to the contract 200, and identification of goods and/or services to be supplied 201. For example, the parties to the contract may be generally grouped into corporations 210 and partnerships/individuals 211. Those project managers 130 dealing with corporations would be directed to educational session A (220) which contains specific educational programs toward the required contractual language to be used with corporations. Similarly, the project manager 130 would be trained in educational session B (221) for proper language to be used when contracting with partnerships/individuals. Regarding the identification of goods/services to be supplied 201, the different technologies 215, 216 as well as internal projects 217 can be identified as the different items to be supplied. For example, some other technologies include business services, connectivity, software, technical (IT) equipment, technical subcontracting services, and telecommunications. Each of these technologies 215–217 would require potentially different contractual language, for which educational sessions C–F (225–228) would provide the project manager 130 with sufficient training.

The invention also provides flexibility in that the user does not need to engage every educational session available when preparing a document. Instead, the user is provided the option to skip any educational sessions for which they have previously completed training. The invention includes update notices to provide information as to whether the education management module 110 has updated any educational session within the educational database 100 since the time the project manager 130 last took the specific educational session. In a preferred embodiment, if the user is proceeding through an educational session on an update basis, they are preferably directed only toward the updated information as opposed to being required to proceed through the entire educational session. In another embodiment, the invention tracks each user's progress through different educational sessions to ensure that the educational requirements are being complied with, as well as to note when an educational session does not need to be reviewed by a given user. This also allows the invention to periodically require refresher educational sessions when a specific period of time has expired since the educational session was taken by a given user on a given topic.

Figure 3:
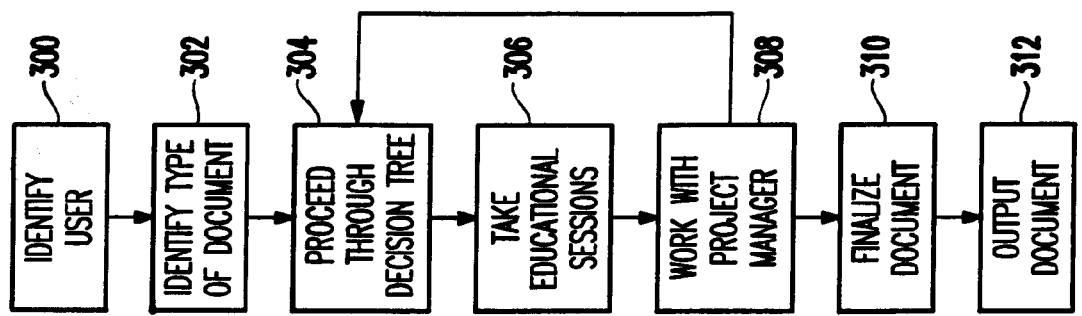
FIG. 3 is a flow diagram illustrating a preferred method of the invention.

One example of the invention is shown in a flowchart form in FIG. 3. More specifically, in item 300, the user identifies themselves to the system. As mentioned above, the system could keep track of which educational sessions have been recently completed by each user, thereby making the educational sessions only required for those users who have not recently taken the educational sessions. Next, in item 302, the type of document to be prepared is identified. As shown above a SOW or other deliverable document could be prepared with the invention. Similarly, any type of binding contract, letter, memorandum, internal work document, etc. can be created with the invention.

In item 304, the user proceeds through the decision tree and, in item 306 takes educational sessions when necessary.

As a result of the educational sessions, the user will probably have contact and points of negotiation with the outside party, as shown in item 308. Upon completing a specific educational session and resolving a specific issue, the user continues to proceed through the decision tree 304 and take additional educational sessions 306 to resolve issues with the procurement buyer 308 until the entire decision tree is completed. When the decision tree is completed, the document is finalized. Thus, a deliverable document is produced as a results of the educational sessions as shown in item 310. In other words, each educational unit teaches the user how to prepare a specific portion of the document being created. Therefore, as the user progresses through the decision tree, they are actually drafting portions of the deliverable document. This is one aspect that sets the invention apart from conventional systems in that the educational sessions produced deliverable documents as opposed to simulated examples. In item 312, the document is physically produced and signed as necessary.

Figure 4:
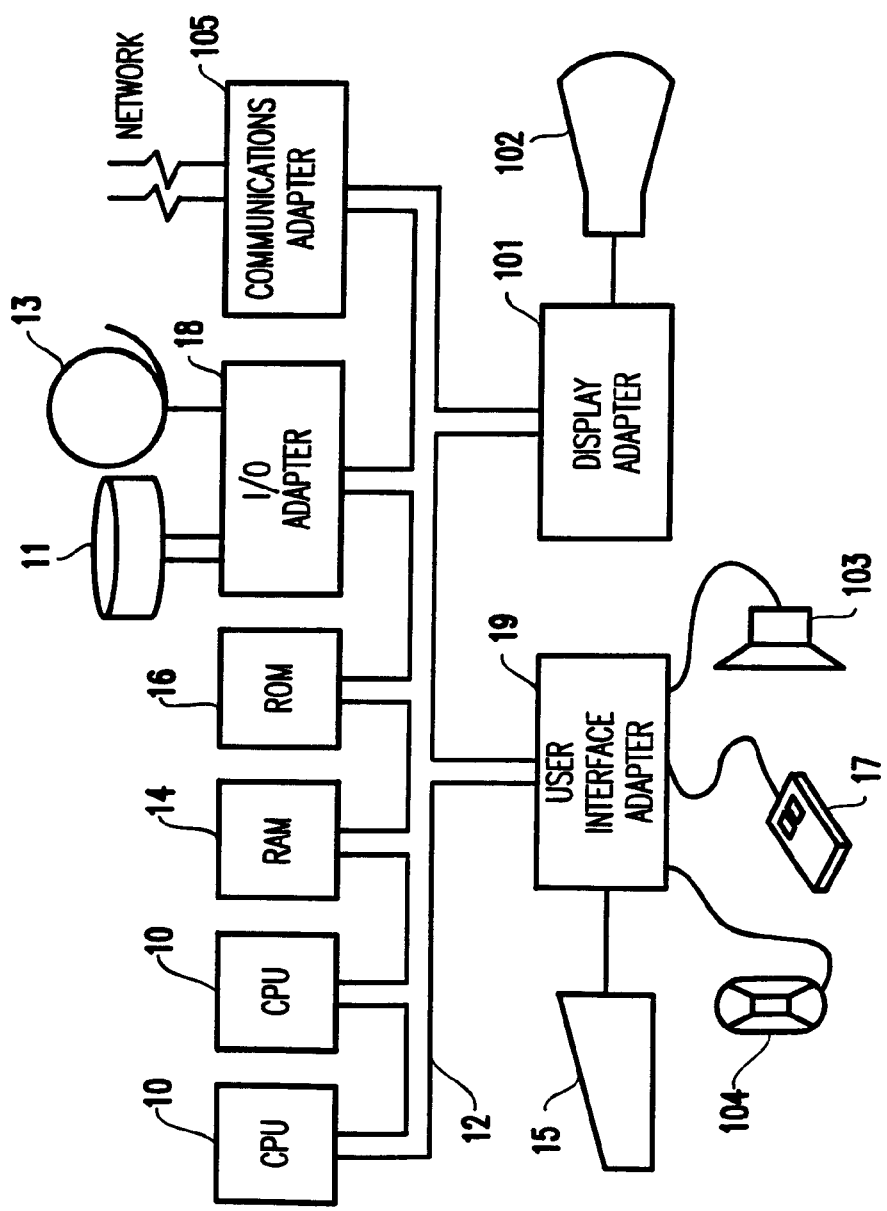
FIG. 4 is a schematic diagram of a computer system for implementing the invention.

A representative hardware environment for practicing the present invention is depicted in FIG. 4, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate on a wiring interconnect design which is also loaded onto the computer system.

Thus, when prompted by a user through the user interface 130, the invention provides a specific educational session from the database 100 that is directed to satisfying a present business need/solution (e.g., a need for a deliverable document with a supplier). With the invention, the educational session produces a completed version of the deliverable document. The user interface 130 preferably includes a decision tree (FIG. 2) providing options for the user to select from different computerized educational sessions relating only to the present business need/solution. While the database 100 includes educational material relating to many business needs/solutions, the decision tree limits user access to only those educational sessions relating to the present business need/solution. The database 100 is continually updated with current educational information that corresponds to related corporate goals. Also, the specific educational session is preferably presented only to a single user and only when the business need/solution is presently pending.

The invention can be easily implemented in any common graphic user interface software program, such as Lotus Notes software program available from International Business Machines Corporation, Armonk, N.Y., USA. The invention allows a practitioner to receive classical education while at the same time solving an immediate real world problem. Therefore, the invention conceptually includes two parts; "Do It Now" and "Learn How". In "Do It Now" the invention guides a student step-by-step through the intricacies of writing supplier requirements and produces a work product. In "Learn How" the invention educates about writing supplier requirements for statements of work and how the corporation desires to hire the best supplier at the best price for a project. The invention is used to address the student's immediate business problem.

The invention is advantageous because it is network-based, self-paced, self-explanatory, instructor-less, quickly adaptable to different subjects (not procurement specific), repeatable for subsequent usage, technology friendly for development, and allows for automatic updates to individual databases. The network-based approach meets the requirements of education by being available any time and any place, and allows the content developer to rapidly develop course materials. This offering, is available when and where needed, to help navigate through the intricacies of writing supplier requirements that become part of a SOW. This same logic could be used for other course content and project work products. This offering is a self study course which is downloaded to the students personal data base. The course can be executed from a terminal, desktop, laptop, PDA, etc.

The invention includes a table of content logic that can be retained while the text is rewritten to modify the desired course. In future developments using the invention, work products could be changed, increased or decreased to fit the particular course simply by editing text. Parts of each course can be reused as many times as necessary. Because this course is event driven and produces a draft as its outcome, the user will be able to take the course more than once, as needs arise, to write subsequent supplier requirements.

The invention can also be used in an "island" mode in a system that is not always connected to the network. After downloading the course, the first time, the user will be periodically reminded (prior to subsequent reuse) to reconnect to the network and "update the course" so as to receive the latest revisions. Upon receiving, downloading and replicating the course, the student may proceed to operate in disconnected "island" mode.

The invention enables users to respond more effectively to customer proposals containing third party content. One of the key reasons that have been identified for troubled contracts is the inability to flow down customer requirements. The invention directly addresses this problem by having the educational management module 110 update the educational database 100 to reflect the customer's needs so that SOW contracts can require supplies/services that meet the customer's needs. Traditional stand-up education has not been as effective in educating employees on what is needed to write supplier requirements. This invention enables the student to write supplier requirements and properly engage a project manager. The user can then use the requirements to write an SOW and expeditiously select and contract the best-suited supplier at the best price for the project. This allows the invention to produce a deliverable document at the end. This invention leads the student step-by-step, through the intricacies of writing supplier requirements that become part of a supplier SOW. One of the revolutionary aspects of this invention is that the students learn as they write a deliverable document, while with conventional systems the document preparation is separated from the education and some of the immediate benefit of the education is lost.

To restate the problem situation addressed by the invention: A practitioner has real-time need to accomplish a task and to produce an actual work product. There is no one available to help the practitioner address the problem. The invention provides the practitioner with "just in time"

education/knowledge about the problem at hand and then proceeds to develop a deliverable/work product directly addressing the problem. The invention functions as an "electronic mentor" to the practitioner, providing the why (education/knowledge) as well as the how (work product/deliverable).

While the invention has been described in terms of preferred embodiments, those skilled in the art will recognize that the invention can be practiced with modification within the spirit and scope of the appended claims.

What is claimed is:

1. A system for providing education in a business environment comprising:
   a database of educational material; and
   a user interface;
   wherein, when prompted by a user through said user interface, said system provides a specific educational session from said database that is directed to satisfying a present business need/solution, and
   wherein said present business need/solution is satisfied by a deliverable document generated by said education session.

2. The system in claim 1, wherein said present business need/solution comprises a need fore said deliverable document, wherein said deliverable document comprises a business document.

3. The system in claim 2, wherein said educational session produces a completed version of said deliverable document.

4. The system in claim 1, wherein said user interface includes a decision tree providing options for said user to select from different computerized educational sessions relating only to said present business need/solution.

5. The system in claim 4, wherein said database includes educational material relating to a plurality of business needs/solutions and said decision tree limits user access only to educational sessions relating to said present business need/solution.

6. The system in claim 1, wherein said database is continually updated with current educational information that corresponds to related corporate goals.

7. The system in claim 1, wherein said specific educational session is presented only to a single user and only when said business need/solution is presently pending.

8. A system for providing education in a business environment comprising:
   a database of educational material; and
   a user interface;
   wherein, when prompted by a user through said user interface, said system provides a specific educational session from said database regarding drafting a deliverable document,
   wherein said educational session produces a completed version of said deliverable document, and
   wherein said deliverable document comprises a business document.

9. The system in claim 8, wherein said user interface includes a decision tree providing options for said user to select from different computerized educational sessions relating only to said deliverable document.

10. The system in claim 9, wherein said database includes educational material relating to a plurality of business needs/solutions and said decision tree limits user access to only said educational sessions relating to said deliverable document.

11. The system in claim 8, wherein said database is continually updated with current educational information that corresponds to related corporate goals.

12. The system in claim 1, wherein said specific educational session is presented only to a single user and only when said deliverable document is presently needed.

13. A method for providing education in a business environment, said method comprising:
   creating a database of educational material;
   supplying a user interface; and
   supplying, when prompted by a user through said user interface, a specific educational session from said database that is directed to satisfying a present business need/solution,
   wherein said present business need/solution is satisfied by a deliverable document generated by said education session.

14. The method in claim 13, wherein said present business need/solution comprises a need fore said deliverable document, wherein said deliverable document comprises a business document.

15. The method in claim 14, wherein said educational session produces a completed version of said deliverable document.

16. The method in claim 13, further comprising providing a decision tree to said user through said user interface, wherein said decision tree includes options for said user to select from different computerized educational sessions relating only to said present business need/solution.

17. The method in claim 16, wherein said database includes educational material relating to a plurality of business needs/solutions and said decision tree limits user access only to educational sessions relating to said present business need/solution.

18. The method in claim 13, further comprising continually updating said database with current educational information that corresponds to related corporate goals.

19. The method in claim 13, wherein said specific educational session is presented only to a single user and only when said business need/solution is presently pending.

20. A method for providing education in a business environment, said method comprising;
   creating a database of educational material;
   supplying a user interface; and
   supplying, when prompted by a user through said user interface, a specific educational session from said database that is directed to drafting a deliverable document with a customer or supplier,
   wherein said educational session produces a completed version of said deliverable document, and
   wherein said deliverable document comprises a business document.

21. The method in claim 20, further comprising providing a decision tree to said user through said user interface, wherein said decision tree includes options for said user to select from different computerized educational sessions relating only to said deliverable document.

22. The method in claim 21, wherein said database includes educational material relating to a plurality of business needs/solutions and said decision tree limits user access only to educational sessions relating to said deliverable document.

23. The method in claim 20, further comprising continually updating said database with current educational information that corresponds to related corporate goals.

24. The method in claim 20, wherein said specific educational session is presented only to a single user and only when said deliverable document is needed.

25. A program storage device readable by computer for tangibly embodying a program of instructions, executable by said computer, for performing a method of providing education in a business environment said method comprising:

creating a database of educational material;

supplying a user interface; and supplying, when prompted by a user through said user interface, a specific educational session from said database that is directed to satisfying a present business need/solution, wherein said present business need/solution is satisfied by a deliverable document generated by said education session.

26. The program storage device in claim 25, wherein said present business need/solution comprises a need for a said deliverable document, wherein said deliverable document comprises a business document.

27. The program storage device in claim 26, wherein said educational session produces a completed version of said deliverable document.

28. The program storage device in claim 25, said method further comprising providing a decision tree to said user through said user interface, wherein said decision tree includes options for said user to select from different computerized educational sessions relating only to said present business need/solution.

29. The program storage device in claim 28, wherein said database includes educational material relating to a plurality of business needs/solutions and said decision tree limits user access only to educational sessions relating to said present business need/solution.

30. The program storage device in claim 25, said method further comprising continually updating said database with current educational information that corresponds to related corporate goals.

31. The program storage device in claim 25, wherein said specific educational session is presented only to a single user and only when said business need/solution is presently pending.

* * * * *